(12) United States Patent  
Massam et al.

(10) Patent No.: US 8,130,681 B2
(45) Date of Patent: Mar. 6, 2012

(54) NARROW BAND TRANSCEIVER

(75) Inventors: Peter David Massam, Saffron Walden (GB); Philip Alan Bowden, Wokingham (GB); Timothy David Howe, Great Shelford (GB)

(73) Assignee: Plextek Limited, Essex (GB)

( * ) Notice: Subject to any disclaimer, the term of this patent is extended or adjusted under 35 U.S.C. 154(b) by 384 days.

(21) Appl. No.: 12/474,826

(22) Filed: May 29, 2009

(65) Prior Publication Data

US 2009/0303981 A1 Dec. 10, 2009

Related U.S. Application Data

(63) Continuation of application No. PCT/GB2007/004596, filed on Nov. 30, 2007.

(30) Foreign Application Priority Data

Dec. 1, 2006 (GB) .................................. 0624017.0

(51) Int. Cl.
*H04B 7/005* (2006.01)
(52) U.S. Cl. ....................................................... 370/278
(58) Field of Classification Search ........................ None
See application file for complete search history.

(56) References Cited

U.S. PATENT DOCUMENTS

| 5,475,686 | A | * | 12/1995 | Bach et al. ..................... 370/465 |
| 5,537,435 | A | | 7/1996 | Carney et al. |
| 5,872,645 | A | | 2/1999 | Proctor |
| 2002/0080742 | A1 | * | 6/2002 | Proctor, Jr. .................... 370/335 |
| 2003/0016797 | A1 | * | 1/2003 | Zakrzewski et al. ........ 379/93.32 |

FOREIGN PATENT DOCUMENTS

| EP | 0131662 A | 1/1985 |
| EP | 0131662 A1 | 1/1985 |
| EP | 1331747 A2 | 7/2003 |
| EP | 01643268 A | 4/2006 |
| EP | 1643268 A1 | 4/2006 |
| WO | 2004032380 A | 4/2004 |
| WO | 2004032380 A1 | 4/2004 |

* cited by examiner

*Primary Examiner* — Raj Jain
(74) *Attorney, Agent, or Firm* — BainwoodHuang

(57) ABSTRACT

The data transmitted from a first station is transmitted at a first data rate. The data transmitted from a second station is transmitted at a second data rate. The second data rate is lower than the first data rate. In view of both the difference in data rates and the synchronization between radio stations, a separate synchronization word is not required to be sent from the second station to the first station on the uplink portion; instead, and because the uplink slots of a given frame are synchronized between transceiving stations, the start of the uplink payload slot can comprise signalling information which simply acts to signify the start of transmission of uplink data from the second station.

13 Claims, 7 Drawing Sheets

NARROW BAND TRANSCEIVER

CROSS REFERENCE TO RELATED APPLICATIONS

This patent application is a Continuation of International Patent Application No. PCT/GB2007/004596 filed on Nov. 30, 2007 and entitled "NARROW BAND TRANSCEIVER", the contents and teachings of which are hereby incorporated by reference in their entirety.

FIELD OF THE INVENTION

The present invention relates to a system for and method of digital communications, and is particularly, but not exclusively, suited to transceiving data at low data rates.

BACKGROUND OF THE INVENTION

The majority of point-to-multipoint radio communications systems operate at relatively high bandwidths, due to the high data rates and real-time requirements associated with data receipt and transmission. It would be attractive to operate at low bandwidths for applications having less stringent data rate requirements because of the commensurate advantages in relation to range and reduction in power requirements. However, low bandwidth systems can incur significant frequency lock problems due to the fact that the frequency error between the transmitter and the receiver is much greater than the signal bandwidth; the identification of the frequency error typically involves use of high accuracy components, which equates to a significant overhead in terms of costs, and to a commensurate limitation in the use of low bandwidth systems.

U.S. Pat. No. 6,522,698 offers a low cost solution in which the bulk of the decoding and processing is performed in the central station, any given remote station simply having to transmit at a relatively low data rate: the remote station (or outstation) is configured so as to generate uplink messages arbitrarily in time, leaving it to the base station to identify the unique signature of any given remote station. Typically this involves providing the base station with many sliding detectors, which are expensive in terms of computational requirements, and, for a large number of remote stations, can become prohibitively costly.

It would be desirable to provide a lower cost narrow band transmission system that is suitable for use with a significant number of remote outstations.

SUMMARY OF THE INVENTION

In accordance with one aspect of the present invention, there is provided a method of signalling the transmission of data from a first transceiver to a second transceiver, the data being contained within a set of slots, the method comprising:
receiving data transmitted from the second transceiver at the first transceiver;
adjusting timing associated with the first transceiver on the basis of the data received from the second transceiver so as to synchronise a timing characteristic of the first transceiver with a timing characteristic of the second transceiver;
transmitting signalling information identifying transmission of data from the first transceiver, the signalling information being transmitted on the basis of the timing characteristic determined from the adjusted timing of the first transceiver, wherein the data transmitted from the first transceiver is transmitted at a first data rate, the data transmitted from the second transceiver is transmitted at a second data rate, and the first data rate is lower than the second data rate.

In at least one embodiment of the invention the second transceiver is embodied as a central station (commonly referred to as a base station) and the first transceiver by an outstation remote therefrom; thus in embodiments of the invention, the remote station is arranged to adjust timing information on the basis of data received from the base station, and uses the timing data to synchronise itself with the base station.

The first data rate can be less than one half, one third, one fifth, or approximately one tenth of the second data rate. Most preferably the first data rate is one eighth of the second data rate, so for a second, or downlink, transmission rate of 500 bits per second (bps), the uplink transmission rate is preferably 8 times slower, i.e. 62.5 Hz. As a result, the uplink round trip delay for an outstation located 10 km from the base station is very small in relation to the uplink bit period (67 µs vs 16 ms).

Whilst 62.5 bps is a preferred data rate for the uplink, other uplink data rates are possible, preferably ranging between 16 and 1500 bps: for an uplink data rate of 16 bits per second the downlink data rate is preferably greater than 32 bps and is most preferably 128 bps; for an uplink data rate of 500 bps the downlink data rate is preferably greater than 1000 bps and is most preferably 4000 bps, whilst for an uplink data rate of 1500 bps the downlink data rate is preferably greater than 3000 bps and most preferably 12000 bps.

When the timing of the remote outstation is adjusted on the basis of data received from the base station according to embodiments of the invention, approximately ¼ bit timing accuracy can be achieved on the downlink. For the case in which the uplink data rate is ⅛ of the downlink data rate, ¼ bit timing accuracy on the downlink maps to ¹⁄₃₂ of a bit on the uplink, and for practical purposes, this can be considered to be perfect. In view of the additional fact that the time of flight for data transmitted over a range of approximately 10 km is several orders of magnitude lower than the uplink bit period (16 ms), this all leads to a situation in which uplink time slots can be considered to be perfectly synchronised between base station and outstation and thus relieves the base station from having to identify uplink transmissions from individual outstations in the time domain.

Thus this synchronisation can be used most effectively when transmitting data to the base station, since if the remote station is synchronised with the base station, this implicitly reduces the amount of processing that is required to be performed by the base station upon receipt of signals from remote stations. It will be appreciated that when there is a significant number of such remote stations, each transmitting somewhat independently of one another, this significantly relieves the processing requirements on the base station that would otherwise be required with prior art systems such as U.S. Pat. No. 6,522,698.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2b is a schematic diagram showing portions of a first time slot of the frame shown in FIG. 2a;

DETAILED DESCRIPTION OF THE INVENTION

The transceivers and communications systems described herein have general application. However, for clarity, the systems and methods are described in the context of remote metering systems such as are used in conjunction with utility meters in a domestic or commercial environment. It is to be understood, however, that the invention is not limited to such applications. For example, the present invention may be applied to low data rate telemetry from remote (e.g. non-mains powered) installations such as water reservoirs; from personal or property accident or attack security alarms such as rape alarms, mountain rescue alarms, etc.; security systems for buildings, low-power wireless alarms, connection of static alarms to a national central monitoring system; remote controls for example in a domestic environment such as for electrical appliance control; remote controls for use in controlling devices such as street lamps; tracking systems for recovering stolen property such as vehicles; and non-radio communications system using, for example, signalling via electricity mains supply. The following description makes mention of various values—in terms of frequency, sampling rates etc.; it is to be appreciated that the particular values are exemplary only and that the invention is not to be limited to any particular individual or combinations of values.

Figure 1:
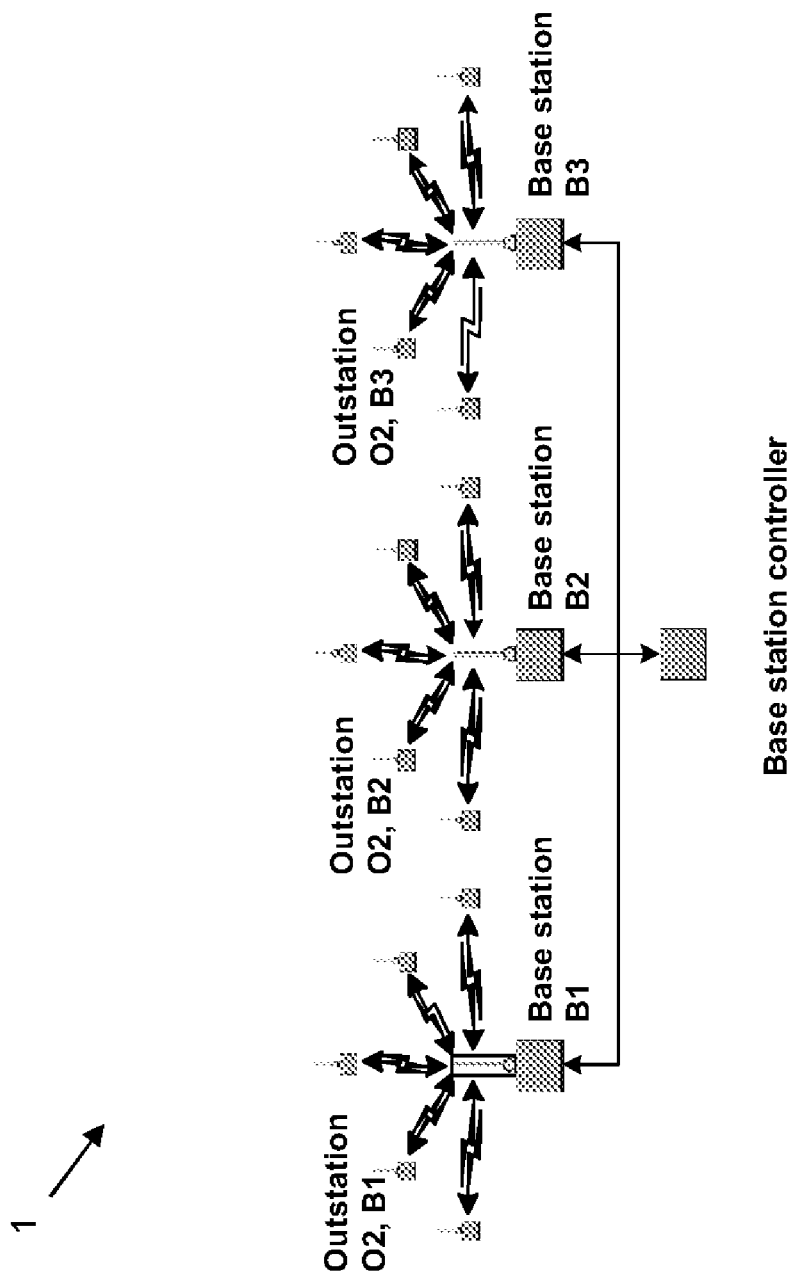
FIG. 1 is a schematic diagram showing an example of a point-multipoint system within which embodiments of the invention can operate.

Referring to FIG. 1, in one arrangement, the communications system 1 comprises a set of base stations B1 ... Bn, each base station Bi being capable of communicating with a set of outstations $O1_{Bi}$ ... $On_{Bi}$ (where i and n are index identifiers indicating that any given base station $B_i$ has n outstations associated therewith). Each of the base stations and outstations is capable of duplex communications and the base stations transmit data according to a frame structure. The transmission includes elements that are relevant to all outstations, and elements that are specifically for one outstation. Time Division Duplex (TDD) is used to multiplex the messages onto a single carrier, and the modulation employed is 500 bits per second (bps) continuous-phase Frequency Shift Keyed (FSK) with ±250 Hz deviation. Whilst not essential, in some arrangements (e.g. when the communications system 1 is used in the USA) the base stations use frequency hopping as mandated by the Federal Bureau of Communications (FCC), which involves changing the transmit frequency every 0.4 seconds. The format of a given frame will be described in detail below, but suffice to say that the corollary of this frequency hopping condition is that any given time slot within a frame has a duration of 0.4 seconds; thus for a downlink bit transmission rate of 500 bps any given time slot can contain up to 200 bits of data.

Figure 3:
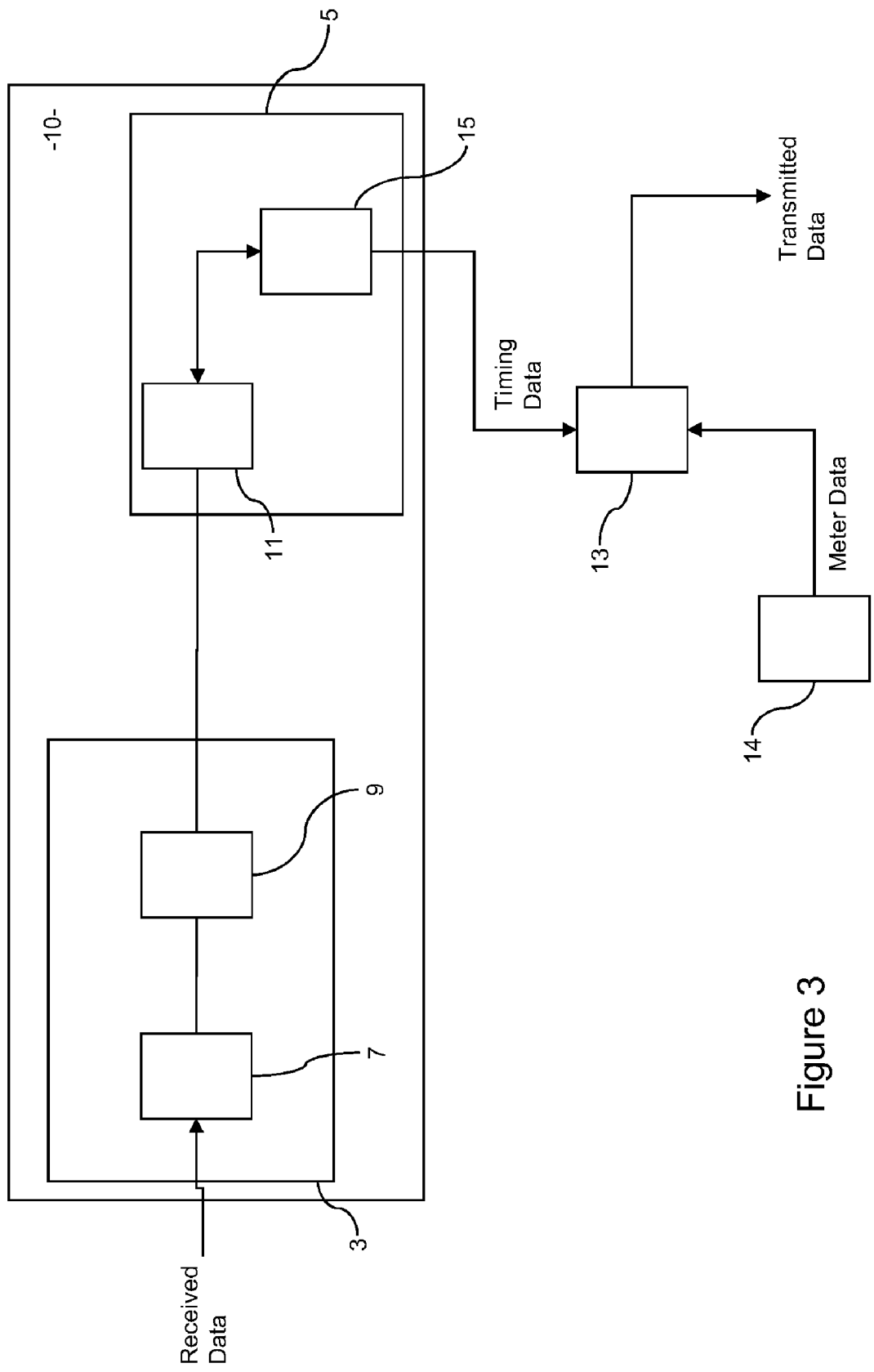
FIG. 3 is a schematic diagram showing components of a receiver utilised by an outstation shown in FIG. 1.

A first aspect of the invention is concerned with the functionality of the outstations, specifically the transmitter and receiver parts thereof, and will be described in the context of a frame according to an embodiment of the invention. Turning to FIG. 3, in overview, the outstation comprises a receiver 10, a transmitter 13 and is in operative association with a meter collector 14, which is typically a conventional meter reading device such as is installed in domestic premises. The receiver 10 is arranged to decode frame data received from the base station, as is described in detail below, and the collector 14 is arranged to collect meter data and forward the same to the transmitter 13 for transmission at a time determined by the frame format, as will be described in detail below.

As mentioned above, the downlink transmission rate is 500 bps; the uplink transmission rate is significantly slower than the downlink rate—preferably 8 times slower, i.e. 62.5 Hz—so that the uplink round trip delay for an outstation located 10 km from the base station is very small in relation to the uplink bit period (67 µs vs 16 ms).

Figure 2A:
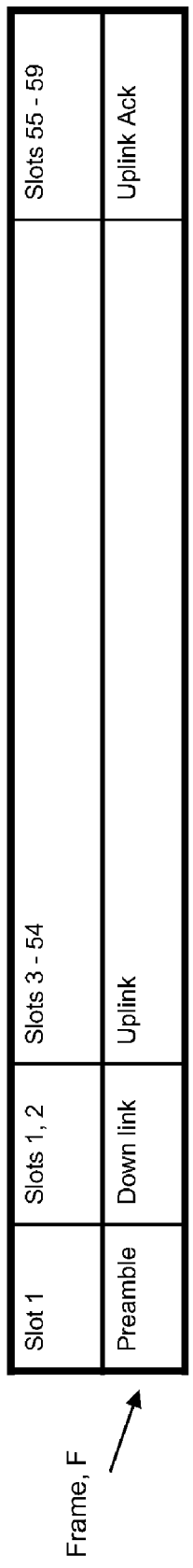
FIG. 2a is a schematic diagram showing allocation of time slots of a frame according to embodiments of the invention.
Figure 2B:
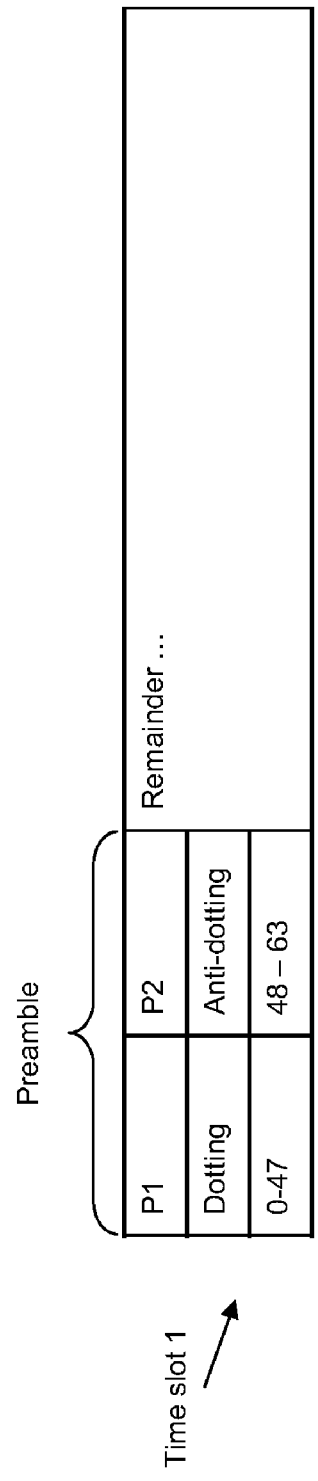

As is well known in the art, transmissions from a base station are typically organised in frames, which, as shown in FIG. 2a, include a plurality of time slots, each of which is dedicated to a transmitting/receiving event (on the part of the base station or outstation). A preamble always appears at the beginning of the transmission and occupies the start of every frame (time slot 1); thus detection of a preamble in a base station's transmission is the first stage in demodulation by the receiver 10 of the transmissions from the base station. Referring to FIG. 2b, in one arrangement the preamble comprises two sequences of data P1, P2, the second sequence P2 being the inverse of at least part of the first sequence P1. The remainder of the time slot 1 comprises payload and error detection portions (not shown).

The first and second sequences P1, P2 are preferably periodic; for example the first sequence can comprise a so-called dotting sequence $\{0, 1, 0, 1 ...\}$ and the second sequence can comprise a so-called anti-dotting sequence $\{1, 0, 1, 0 ...\}$. In general the sequences contain a pattern that repeats within the sequence, and comprises a non-prime number of elements (the dotting/anti-dotting sequence comprises a repeating pattern of two elements (0, 1) and (1, 0) respectively). Preferably the pattern comprises an arbitrary sequence of bits and the second sequence can comprise a different number of repetitions to that included in the first sequence. In a most preferred arrangement the first sequence P1 comprises 24 pairs of dotting and the second sequence P2 comprises 8 pairs of anti-dotting.

Figure 4:
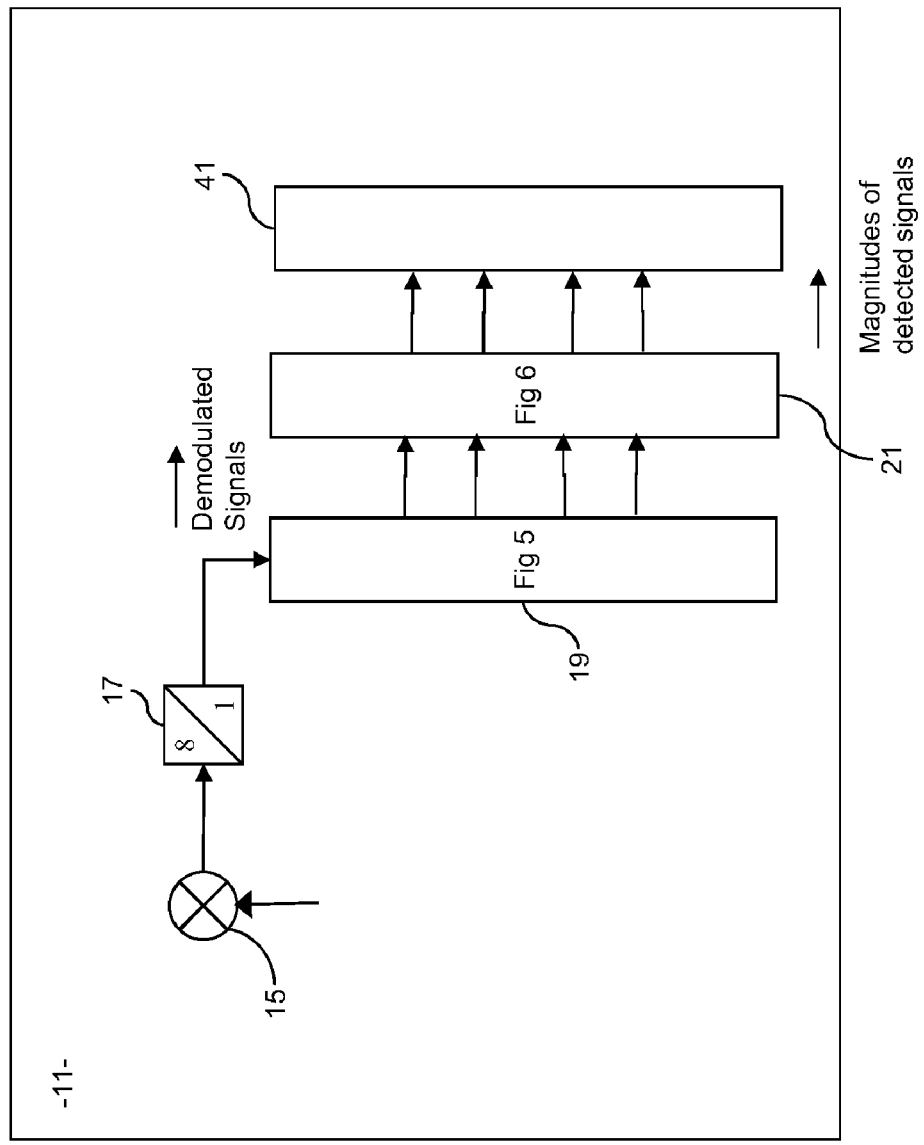
FIG. 4 is a schematic block diagram showing components of the signal processor of FIG. 3.

The significance of the preamble in relation to aspects of the transmitter and receiver will now be described with reference to FIGS. 3-5. The receiver 10 comprises an analogue receiver part 3 and a signal processor 5, and in one embodiment the analogue receiver part 3 comprises a down converter 7, which converts the carrier frequency of the received data signal to an intermediate frequency (IF) of approximately 8 kHz. The quadrature IF signals are sampled by an Analogue to Digital Converter 9 (ADC), which generates, as output, complex 2×12-bit samples at 32 ksps having an effective noise bandwidth of 20 kHz; the output of the ADC 9 is fed into the signal processor 5.

As described above, embodiments of the invention transmit and receive at low data rates so as to keep power requirements to a minimum yet be able to transceive data over long distances. In the following, it is assumed that the outstation has identified the nominal carrier frequency associated with the time slot, though not the actual value of the carrier frequency as it appears to the oscillator local to the outstation; there is therefore an as yet undetermined frequency error between the base station and the outstation (that is to say the difference between the value of the frequency at which signals are transmitted and the value that such frequencies appear to be to the outstation). As described in the background section this frequency error can be greater than the signal bandwidth, since this is, by definition, small.

In order to be able to successfully demodulate the signal in a narrow noise bandwidth (which is essential for long range) it is necessary to remove the frequency error. In embodiments of the invention this is done by means of a Fast Fourier Transform (FFT) which, with reference to FIG. 3, is implemented within a demodulating part 11 of the signal processor 5 and essentially acts as a bank of filters spaced based around the outstation's version of the carrier frequency. As shown in FIG. 4, in addition to an FFT 19, the demodulating part 11 also comprises a narrowband detector element 21, which serves to identify bit timing associated with the preamble, as will be described in more detail below.

Returning to FIGS. 2b and 3, once the bit timing has been identified, this is passed to a transmitting part 13, which uses the bit timing information to calibrate the timing of the outstation, essentially synchronising the time slots, as they appear to the clock of the outstation, with those of the base station. This in turn enables the outstation to synchronise transmission of the uplink data with the expected time of receipt of uplink data at the base station, and, because the uplink data rate is low, this relieves the base station from having to identify where the uplink data are in the time domain.

The details of these various parts and processes will now be described in detail, starting with the demodulating part 11 and referring firstly to FIG. 4. It is to be understood that the mechanism described herein for retrieving the bit timing from received downlink data is not essential to embodiments of the invention: more specifically, embodying the preamble portion as a first and second sequence P1, P2 as described above and utilised in the manner described below provides for an extremely efficient and low cost method of identifying bit timing (so is indeed a preferred method). However, any type of preamble and alternative decoding method could be used, provided it facilitates extraction of synchronisation between the clocks of the base station and outstation respectively.

In one arrangement the demodulating part 11 comprises an oscillator 15 for mixing the received samples to base-band, and means 17 for decimating the mixed signal so as to modify the rate at which data are introduced to the FFT 19; the oscillator 15 multiplies the ADC samples received from the analogue receiver part 3 by a complex exponential tuned to the nominal IF (8 kHz) and the decimation applied by part 17 results in a baseband signal nominally centred at 0 Hz and sampled at 4 kHz. The oscillator 15 is preferably in operative association with an anti-aliasing filter (not shown) acting as a low-pass filter. As a result of the decimation, therefore, samples are introduced into the FFT at a rate of 4 kHz; in a preferred arrangement the bin resolution of the FFT is chosen to be 62.5 Hz, meaning that the FFT 19 comprises a 64 point FFT (4000/62.5), as indicated in FIG. 5.

Figure 5:
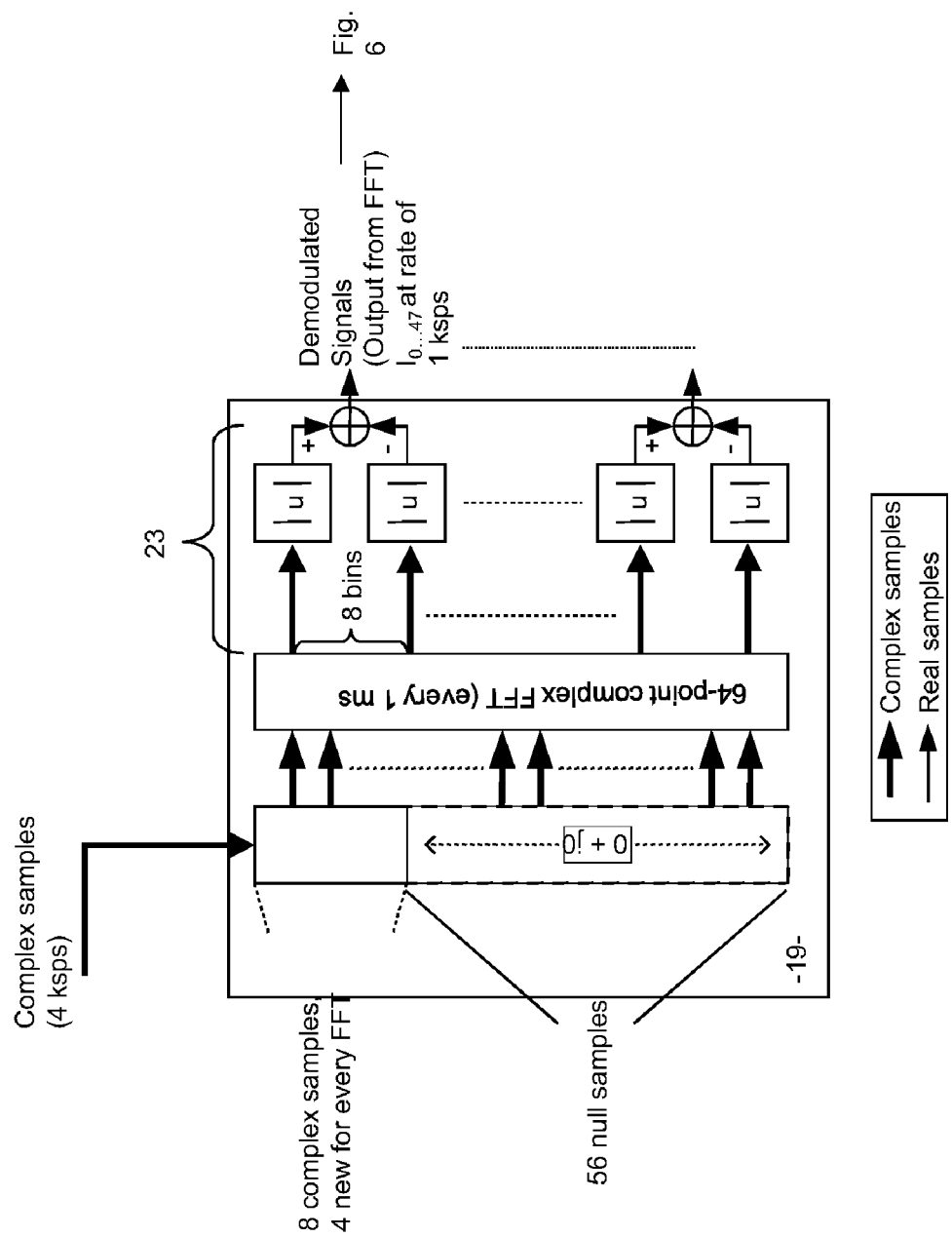
FIG. 5 is a schematic block diagram showing components of an FFT-based parallel demodulator forming part of the receiver of FIG. 4.

The FFT 19 is preferably carried out every 1 ms, so that for an input rate of 4 kHz, 4 new samples are added for each iteration of the FFT and the FFT bins span ±2 kHz, which means that for a data rate of 500 bps (i.e. a bit period of 2 ms) there will be 2 FFT results in every bit period. Demodulation of the preamble is effected by taking the difference in magnitude between pairs of bins separated by twice the $$\text{frequency deviation} = \frac{2 \times 250}{62.5} = 8 \text{ bins;}$$

this is indicated by portion 23 in FIG. 5. This is quite different to methods such as that described in U.S. Pat. No. 6,522,698, in which demodulation is performed as a separate process to that of frequency identification (in addition to being performed at the base station as opposed to in the outstations).

In FIG. 5 the input samples are indicated as being complex samples; for such arrangements bins 32 to 63 correspond to negative frequencies, which means that the ordering of the bins has to be re-ordered in accordance with ascending order of frequency prior to evaluating the difference between respective pairs of separated bins. The output of the FFT 19 is a set of 56 demodulated frequency offsets, and typically a subset of the set (e.g. the central 52 or 50 or 47; preferably 47, indicated by $I_{0...47}$) is selected for input to the narrowband detector 21.

Figure 6:
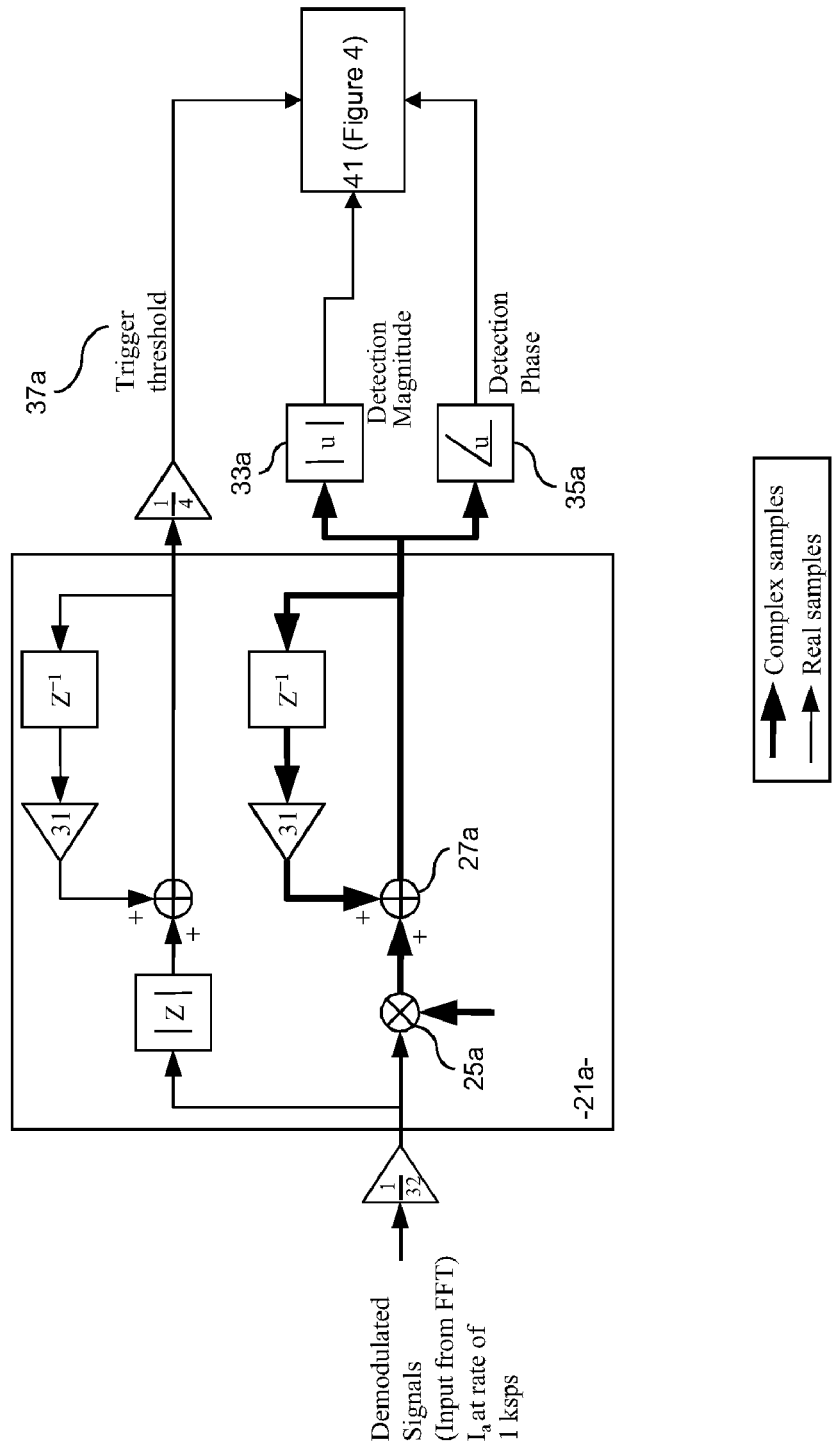
FIG. 6 is a schematic block diagram showing components of a narrowband detector of FIG. 4.

The narrowband detector 21 comprises a plurality of detector elements $21_0 \ldots 21_{47}$ (only one, 21a, is shown in FIG. 6), each of which receives one of the (47) demodulated inputs $I_a$ from the FFT 19, and mixes the input with an oscillator 25a in order to mix the fundamental of the periodic pattern down to 0 Hz. The output of the oscillator 25a is then low-pass filtered by means of a leaky integrator 27a (e.g. an impulse response filter), which essentially sums the magnitude of successively received inputs from the FFT 19. A leaky integrator (as opposed to other filter types) is preferable for the low-pass filter because it provides a convenient mechanism for adjusting the bandwidth without affecting processing or memory requirements.

Figure 7:
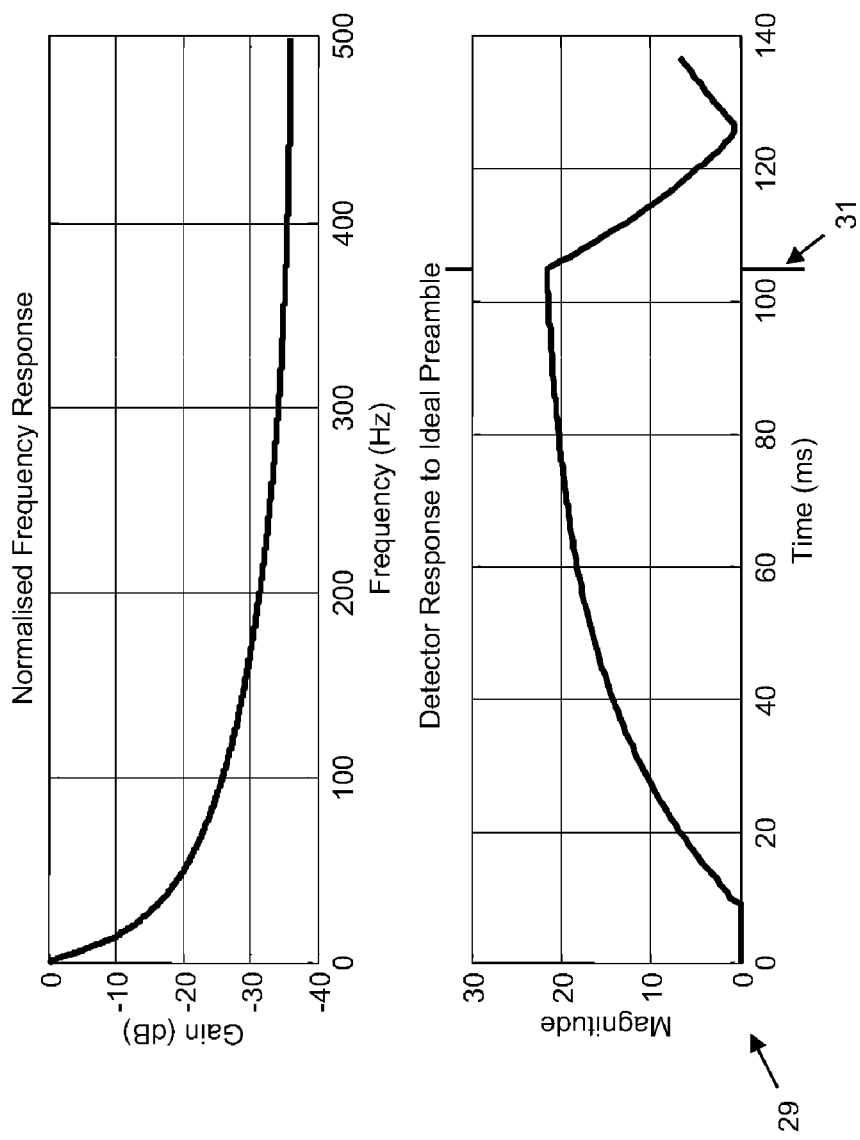
FIG. 7 is a graphical representation of output of a leaky integrator component shown in FIG. 6.

FIG. 7 shows the frequency response 29 of the leaky integrator 27a and the time response of the detector to successively received parts of an ideal preamble signal. The relatively sharp decay 31 of the response 29 results from the anti-dotting sequence P2 of the preamble portion, and, because the transition from the dotting sequence P1 to the anti-dotting sequence P2 occurs within a single bit, it is this part of the response that enables bit timing to be identified from the preamble.

Turning back to FIG. 6, each narrowband detector element $21_a$ also comprises means 33a, 35a for calculating the mean magnitude and phase of the input $I_a$ received from the FFT 19, and the magnitude values are input to an algorithm 41 for determining whether or not the input $I_a$ received from the FFT 19 corresponds to a preamble (rather than noise). Various mechanisms can be utilised to implement the trigger criteria, and in fact the roll-off associated with various other parts of the receiver 10 means that there is no single value that is appropriate for all of the inputs received from the FFT 19; instead the trigger threshold that is appropriate for a given input $I_a$ from the FFT 19 is selected and input to the algorithm 41, modified (where appropriate) to account for local interference, as indicated as part 37a in FIG. 6.

In one arrangement, the algorithm 41 compares the mean magnitude received from each narrowband detector $21_{0...47}$ against its respective threshold value, and in the event that the magnitude for that output exceeds the threshold value for more than a specified period of time, the receiver 10 enters into a "triggered" state in respect of the narrowband detector element $21_i$ under examination. Having reviewed the set of magnitude outputs from all of the narrowband detector elements $21_{0...47}$, the algorithm 41 identifies the output having the largest magnitude, and this is used to define a new threshold, $Th_{detect}$. This new threshold is applied to the output of all of the narrowband detector elements $21_{0...47}$ and the process repeated until the signal level in a "triggered" narrowband detector element $21_i$ drops below the threshold: this point is deemed indicative of transition point 31 shown in FIG. 7.

Various timeout-related conditions can also be applied in order to eliminate false detections, and the skilled person would be able to design appropriate controls to mitigate these.

Returning back to FIG. 3, the output of the demodulating part 11, which comprises successively generated magnitude information identified by the algorithm 41, is input to a controller 15. The controller 15 can be used to identify both the frequency error and the bit timing on the basis of the outputs from the narrowband detector elements $21_0 \ldots {}_{47}$ and the algorithm 41 (as described above and based on FIG. 7); once these have been determined, the controller 15 adjusts the internal clock of the outstation on the basis of the bit timing information, in accordance with known methods. According to various tests that have been performed, timing synchronisation at the outstation in relation to downlink transmissions can be achieved in this manner to something like within ¼ bit.

Referring back to FIG. 2a, at a time corresponding to time slot 3, the transmitting part 3 FSK modulates a predetermined carrier frequency, firstly using a predetermined identifier, and then using any meter data received from the collector 14. Since the outstation timing has been adjusted so as to concord with that of the timing of the base station, and because the uplink data rate is ⅛ of the downlink data rate, the aforementioned ¼ bit timing accuracy on the downlink maps to 1/32 of a bit on the uplink; for practical purposes, this can be considered to be perfect. In view of the additional fact that the time of flight for data transmitted over a range of approximately 10 km is several orders of magnitude lower than the uplink bit period (16 ms), this all leads to a situation in which uplink time slots can be considered to be perfectly synchronised between base station and outstation and thus relieves the base station from having to identify uplink transmissions from individual outstations in the time domain.

It will therefore be appreciated that the predetermined identifier preceding the meter data essentially signals the presence of meter data to the base station and is included simply to assist the base station in detecting the presence of transmissions from outstations and to measure signal strengths; importantly, the transmitting part 13 is not required to precede the uplink payload with a bespoke synch word, such as is normally sent when the base station is required to identify where the uplink data are in the time domain.

The above embodiments are to be understood as illustrative examples of the invention. Further embodiments of the invention are envisaged. For example, the first and second sequences P1, P2 could be embodied as a dotting sequence based on the 1100 pattern, which would make the FFT 19 more resistant to noise, but at the cost of requiring longer sequences.

It will thus be appreciated that embodiments of the invention are concerned with a system for use in narrowband RF system, in which data are transceived between radio stations in frames comprising slots having finite periods (and thus discrete start and end points within the frame), and the timing of a clock internal to a given station determines where in time respective slots start and finish. In one arrangement the synchronisation between two communicating radio stations (first and second stations) is configured on the basis of timing information derived from a preamble portion of a given frame that is transmitted from a first station to a second. This timing information is used to configure a clock internal to the second station; by adjusting the time of the clock, the timing of the slots within a given frame can therefore be controlled. This can be particularly advantageously applied to the uplink slots of the given frame (i.e. when the second base station transmits its data to the first station) so as to ensure that data received on the uplink are synchronised with timing characteristics of the first (data processing) station.

In embodiments of the invention the data transmitted from the first station is transmitted at a first data rate, the data transmitted from the second station is transmitted at a second data rate, and the second data rate is lower than the first data rate. In view of the difference in data rates and the synchronisation between radio stations, a separate synchronisation word is not required to be sent from the second station to the first station on the uplink portion; instead, and because the uplink slots of a given frame are synchronised between transceiving stations, the start of the uplink payload slot can comprise signalling information which simply acts to signify the start of transmission of uplink data from the second station.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of signalling the transmission of data from a first transceiver to a second transceiver, the data being contained within a set of slots, the method comprising:
   receiving data transmitted from the second transceiver at the first transceiver;
   adjusting timing associated with the first transceiver on the basis of the data received from the second transceiver so as to synchronise a bit timing characteristic of the first transceiver with a bit timing characteristic of the second transceiver;
   transmitting signalling information identifying transmission of payload data from the first transceiver, the signalling information being transmitted on the basis of the bit timing characteristic determined from the adjusted timing of the first transceiver; and
   receiving said payload data at the second transceiver on the basis of the bit timing of the second transceiver,
   wherein the data transmitted from the first transceiver is transmitted at a first data rate, the data transmitted from the second transceiver is transmitted at a second data rate, and the first data rate is less than one half of the second data rate.

2. A method according to claim 1, in which the first data rate is less than one third of the second data rate.

3. A method according to claim 1, in which the first data rate is less than one fifth of the second data rate.

4. A method according to claim 1, in which the first data rate is less than one eighth of the second data rate.

5. A method according to claim 1, in which the first data rate is less than approximately one tenth of the second data rate.

6. A method according to claim 1, in which the first data rate is 1500 bits per second.

7. A method according to claim 1, in which the first data rate is 500 bits per second.

8. A method according to claim 1, in which the first data rate is 62.5 bits per second.

9. A method according to claim 1, in which the first data rate is 16 bits per second.

10. A method according to claim 1, in which the second transceiver comprises a base station operable to communicate with a plurality of first transceivers.

11. A method according to claim 1, in which the first transceiver comprises a remote station operable to communicate with a base station.

12. A method according to claim 11, in which the first transceiver is operable to communicate with at least one other remote station.

13. A narrowband transceiver comprising:

an antenna for transceiving a signal between a first transceiver and said narrowband transceiver, the signal comprising a set of slots, at least one said slot comprising a preamble portion and a payload portion and being transmitted at a predetermined transmission frequency, wherein said predetermined frequency is within a known range of frequencies;

a clock for controlling allocation of uplink portions within a given slot according to a timing characteristic thereof;

a digital filter arranged to divide the range of frequencies of a signal received from the first transceiver into a plurality of frequency bands, wherein, for each data item contained within the preamble portion of a given time slot, the filter is arranged to identify a magnitude of signal received within each said frequency band and identify a plurality of pairs of frequency bands, each said pair of frequency bands comprising a first frequency band and a second frequency band, the filter being arranged, for at least some of the plurality of pairs of frequency bands, to subtract a first signal magnitude identified for said first said frequency band from a second signal magnitude identified for said second said frequency band, whereby to demodulate the signal within at least part of said preamble portion of the given time slot;

a detector element arranged to combine the subtracted signal magnitudes corresponding to respective pairs of frequency bands with output from an oscillator tuned to a fundamental of a period associated with said preamble portion, wherein, for each pair of first and second said frequency bands, the detector element is arranged to accumulate the combined signal magnitudes over the preamble portion, so as to identify timing information for the given time slot;

means for adjusting the timing characteristic of the clock on the basis of the identified timing information of the given time slot; and means for allocating signalling information to an uplink payload portion within the given slot, the means being arranged to determine the uplink payload portion using adjusted timing characteristic of the clock and thence allocate the signalling information to the adjusted uplink payload portion, wherein the data transmitted from the narrowband transceiver is transmitted at a first data rate, the data transmitted from the first transceiver is transmitted at a second data rate, and the first data rate is less than one half of the second data rate.

\* \* \* \* \*